United States Patent [19]

Foggini

[11] Patent Number: 4,724,718

[45] Date of Patent: Feb. 16, 1988

[54] PREFORMED COVERING, PARTICULARLY FOR MOTORVEHICLE GEAR SHIFT LEVERS

[75] Inventor: Paulo Foggini, Revigliasco, Italy

[73] Assignee: Foggini Progetti S.r.l., Beinasco, Italy

[21] Appl. No.: 858,680

[22] Filed: May 2, 1986

[30] Foreign Application Priority Data

May 10, 1985 [IT] Italy ................. 53363/85[U]

[51] Int. Cl.⁴ .................... G05G 1/04; G05G 1/10; B27N 7/00

[52] U.S. Cl. .................... 74/543; 74/523; 264/327; 264/340

[58] Field of Search ............. 74/558, 523, 543, 473 P, 74/473 R, 18.1, 18, 566; 264/328.16, 328.14, 327, 340; 425/552, 548

[56] References Cited

U.S. PATENT DOCUMENTS

| | | | |
|---|---|---|---|
| 3,484,808 | 12/1969 | Conterno | 74/543 |
| 3,561,281 | 2/1971 | Wilfert | 74/523 |
| 3,750,492 | 8/1973 | Holmes | 74/523 |
| 3,795,156 | 3/1974 | Neuscheler | 74/523 |
| 4,234,530 | 11/1980 | Thiel et al. | 264/327 |
| 4,278,633 | 7/1981 | Fujii | 264/344 |
| 4,617,834 | 10/1986 | Foggini | 74/543 |

FOREIGN PATENT DOCUMENTS

| | | | |
|---|---|---|---|
| 0083021 | 7/1983 | European Pat. Off. | 74/523 |
| 2010565 | 9/1971 | Fed. Rep. of Germany | 74/523 |

*Primary Examiner*—Gary L. Smith
*Assistant Examiner*—Vinh Luong
*Attorney, Agent, or Firm*—Guido Modiano; Albert Josif

[57] ABSTRACT

The preformed covering of polymeric material, for motorvehicle gear shift levers, comprises a sleeve portion for covering at least the upper part of a rod of the shift lever and a bellows-like portion, for covering at least the zone of an articulation joint of the lever. The sleeve portion has a top portion of knob-like shape defining internally a hollow space with engagement formations. The top portion of knob-like shape is an integral single piece body portion made integral with said sleeve portion of substantially soft polymeric material and made at least in a central part thereof of a substantially tough polymeric material.

8 Claims, 1 Drawing Figure

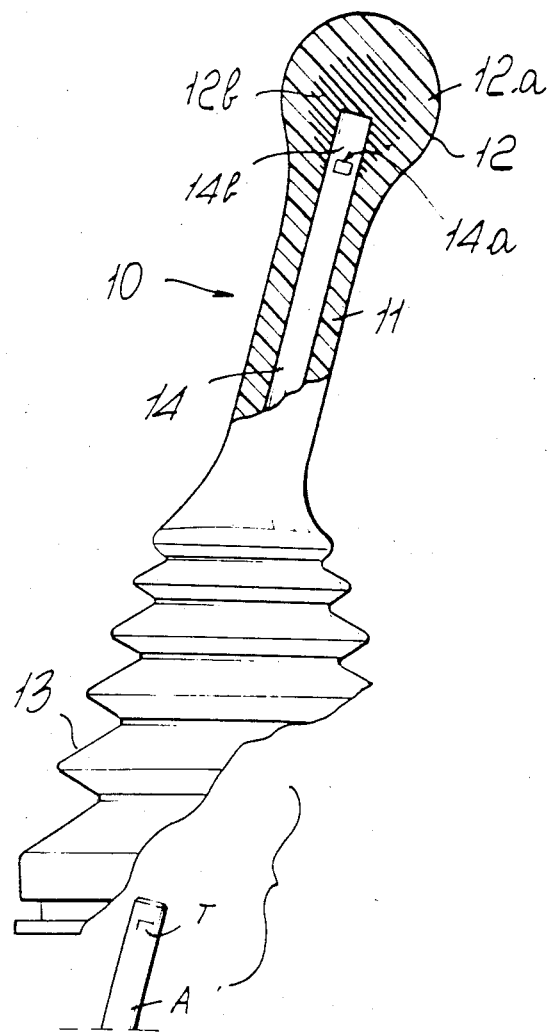

4,724,718

PREFORMED COVERING, PARTICULARLY FOR MOTORVEHICLE GEAR SHIFT LEVERS

BACKGROUND OF THE INVENTION

This invention relates to preformed coverings, particularly for motorvehicle gear shift levers.

From the European Patent Application No. 0 061 662 a covering for gear shift levers is known, in which the covering has a sleeve portion for covering at least the upper part of the rod of the shift lever and a bellows-like portion for covering at least the zone of the articulation joint of the lever. The sleeve portion may either be made integral with the bellows-like portion or such portions may be prefabricated as separate parts, but connected to each other by means of such connection formations that the covering behaves as if the two parts were made integral with each other. The sleeve portion has a top of knob-like shape defining internally a hollow space having an internal diameter greater than the internal diameter of the cylindrical cavity of the sleeve portion in which the rod of the shift lever is received. In the hollow space at the top of the covering an insert of harder material than that of the covering is arranged, in which a seat formation is provided providing a snap engagement with the top portion of the rod of the gear-shift lever. The insert is necessary in order to provide a satisfactory and durable engagement between the rod of the gearshift lever and the covering, since the soft material of the covering is normally insufficiently hard for a durable satisfactory engagement of the rod within the covering without the use of the hard material insert. The insert is inserted in the hollow space of the covering by a co-molding process, which increases both the manufacturing and material costs and affects the behaviour of the two materials at the mutual contact zone at which an abrupt passage from a soft material to a hard material occurs.

SUMMARY OF THE INVENTION

The object of the invention is to remove the problems created by the insert without affecting the performance and behaviour of the covering and even improving such behaviour.

The above problem is solved by the invention as defined in claim 1.

In fact, it has been found according to the invention that the insert of hard material may be entirely removed when the knob-like portion of the covering is made at least in a central part thereof of a polymeric material having a greater toughness as compared to the toughness of the sleeve portion and bellows-like portion of the covering, which may remain soft. With the method of this invention as defined in claim 6 it is possible to obtain a gradual increase of the toughness in the direction of the depth of the wall of the top portion of the covering, so that no abrupt increase of the toughness occurs. As a consequence the elasticity behaviour of the covering is improved and the durability increased even under severe operative conditions.

The terms soft poymeric material and tough polymeric material as used hereinafter should be intended in the sense commonly attributed by such terms to the elasticity behaviour of the coverings of the kind described in the field of the art.

BRIEF DESCRIPTION OF THE DRAWING

The invention will be more fully described hereinafter with reference to the accompanying drawing in which the only FIGURE shows an embodiment of the invention in an exploded longitudinal sectional view, as taken along the longitudinal mid-axis of the rod element.

DESCRIPTION OF A PREFERRED EMBODIMENT

The covering 10 made of polymeric material, preferably PVC (polyvinylchloride) or a copolymer of vinylchloride and propylene in a weight ratio of 2:1, has a central sheath-like sleeve portion 11 which extends at one end portion thereof into a knob-like portion 12 made integral therewith and at the opposite end portion thereof into a bellows-like portion 13 for the protection of the articulation joint of the gear shift lever. The bellows-like portion is either made integral with the sleeve-like portion or the two portions are connected to each other with fastening formations of such kind that the connection performs as if the two portions were made integral with each other as a single piece.

As visible in the drawing in the embodiment shown, the knob-like portion 12 comprises an outer zone 12a of relatively soft polymeric material like the material of which the sleeve portion 11 is made, and an inner zone 12b of tough polymeric material indicated in the drawing with a more dense hatching. It will be understood that outer zone 12a and the inner zone 12b are part of a continuous wall structure. The cylindrical cavity 14 of the sleeve-like portion in which the lever rod A is received extends into a seat 14b provided in the inner zone 12b of the knob-like portion for receiving therein the end portion of the rod A. The seat 14b is provided with a pair of inwardly protruding prong formations 14a made integral with the tough polymeric material of the inner zone 12b of the knob-like portion and located at diametrically opposite positions with respect to each other. Only one rectangular prong formation 14a is shown in the drawing and, as it can be seen, each, prong formation 14a has a rectangular cross section (a cross-section being intended, which is perpendicular to the prong axis extending transverse to the rod axis), with substantially sharp edges and with a thickness which is in the range between one tenth and one fifteenth of the diameter of the rod A. The roughness of the inner surface of such seat formation is such that the friction coefficient between the outside surface of the rod A and the inner surface of the seat 14b is about 0.55. The free end of the rod A is inserted by a force fit into the seat 14b and is provided with a pair of notches T located at diametrically opposite positions on the rod A and adapted to receive therein the prong formations 14a to provide the required snap engagement between the covering 10 and the rod A. The shape of the notches T corresponds to the shape of the prongs 14a. The prong formations 14a are inserted into the notches T by elastic deformation of the prong formations 14a during the insertion of the rod A into the cavity 14 of the covering 10 and subsequent snapping into the notches T when positioned in register therewith. In this way both the relative rotation and the relative longitudinal movements between the rod A and the covering 10 are prevented. The tests carried out have shown that the fastening engagement between the rod and the covering is durable and resistant under severe operative and environmental conditions and even after repeated insertion and disinsertion of the rod into and from the covering.

According to a modified embodiment the entire knob-like top portion may be made of tough polymeric material, whereas the sleeve portion and the bellows-like portion are made of the soft polymeric material.

Instead of polyvinylchloride the material used for the covering may be a copolymer of vinylchloride and propylene, in a weight ratio of 2:1.

The soft polymeric material of this invention has substantially a linear molecular structure and the tough polymeric material has substantially a cross-linked molecular structure, the passage between the soft polymeric material and the tough polymeric material being gradual.

The method for obtaining a covering according to this invention comprises the steps of mixing two parts by weight of vinyl chloride with one part by weight of propylene at 70° C. during four hours in an environment saturated with acetic acid, and injecting the so treated mixture into a mold for imparting the shape to the covering to be obtained, leaving the portions of the mold forming the thinner portions of the covering to be cooled more rapidly than the portions of the mold forming the top portion of the covering, thereby to have the thinner portions of the covering substantially formed with a linear molecular structure and at least a central part of the knob-like top portion of the covering substantially formed with a cross-linked molecular structure imparting an increased toughness to said top portion of the covering and taking the so obtained covering out from the mold.

Arrangements may be made to reduce the cooling rate around the entire knob-like portion of the covering so that the cross-linking of the polymeric material occurs throughout the entire thickness of the knob-like portion of the covering thereby further improving the performance of the covering, the sleeve-like and bellows-like portion being more rapidly cooled within the mold, so that these parts obtain a substantially linear molecular structure throughout.

I claim:

1. Preformed covering of one piece structure of polymeric material, particularly for motor vehicle gear shift levers, comprising:

an elongated sleeve portion having a top portion of knob-like shape adapted to be gripped by hand, continuous wall means of polymeric material defining an elongated internal hollow tubular seat in said sleeve portion for receiving therein a rod portion of the gear shift lever, said continuous wall means having at least one portion thereof of gradually changing degree of hardness in the range from the hardness of a substantially hard polymeric material to the hardness of a substantially soft polymeric material said hollow tubular seat having a hollow extremity portion around which said continuous wall means have an increased degree of hardness, said hollow extremity portion extending into part of said top portion, engagement formations in said hollow extremity portion for engagement with mating engagement formations of said rod portion, a bellows-like portion extending from said sleeve portion remote from said top portion for covering gear shift lever parts connected with said rod portion, said continuous wall means continuously extending into said bellows-like portion to render said bellows-like portion and said elongated sleeve portion a single piece body structure, said bellows-like portion being made of a substantially soft polymeric material.

2. Preformed covering, according to claim 1, wherein said top portion of said covering defines an outer portion and an inner portion, said polymeric material being substantially hard at said inner portion and being substantially soft at said outer portion in order to provide a comfortable grip.

3. A preformed covering according to claim 1, wherein said substantially hard polymeric material has a cross-linked molecular structure and said soft material has substantially a linear molecular structure.

4. A preformed covering according to claim 1, wherein said polymeric material is polyvinylchloride.

5. A preformed covering according to claim 1, wherein said polymeric material is a vinyl chloride and propylene copolymer, the vinyl chloride to propylene weight ration being in the range of 2:1.

6. Preformed covering, according to claim 1, wherein said engagement formations comprise a pair of prongs arranged at diametrically opposite locations in said elongated seat and extending radially toward said rod axis for a selected length.

7. Preformed covering according to claim 6, wherein said length of said prongs is from one tenth to one fifteenth of said rod diameter, said prongs having a polygonal cross-section, said rod member having an external surface, said elongated seat having an internal surface in contact with said external surface, the coefficient of friction between said external surface of said rod and said internal surface of said elongated seat being in the range of about 0.55.

8. Preformed covering of one piece structure of polymeric material, particularly for motor vehicle gear shift levers, comprising:

an elongated sleeve portion with a sleeve axis and having a top portion of knob-like shape adapted to be gripped by hand, continuous wall means defining an elongated internal hollow tubular seat in said sleeve portion for receiving therein a rod portion of the gear shift lever, said continuous wall means having at least one portion thereof of gradually changing degree of hardness, said hollow tubular seat having a hollow extremity portion around which said continuous wall means have an increased degree of hardness, said hollow extremity portion extending into part of said top portion, engagement formations in said hollow extremity portion for engagement with mating engagement formations of said rod portion, said engagement formations comprising a pair of prongs arranged at diametrically opposit locations in said hollow tubular seat and extending radially with respect to said sleeve axis and having a length in radial direction in the range from one tenth to one fifteenth of the internal diameter of said hollow tubular seat, said prongs having a polygonal shape in a cross-section thereof with respect to the radial extension of said prongs, a bellows-like portion extending from said sleeve portion remote from said top portion for covering gear shift lever parts connected with said rod portion, said continuous wall means continuously extending into said bellows-like portion to render said bellows-like portion and said elongated sleeve portion a single piece body structure, said bellows-like portion being made of a substantially soft polymeric material.

* * * * *